UNITED STATES PATENT OFFICE.

JOHN P. SCOTT, OF NEWPORT, KENTUCKY.

IMPROVED COMPOSITION FOR POULTICES.

Specification forming part of Letters Patent No. 40,189, dated October 6, 1863.

*To all whom it may concern:*

Be it known that I, JOHN P. SCOTT, of Newport, Campbell county, Kentucky, have invented a new and useful Composition for Poultices; and I do hereby declare the following to be a full, clear, and exact description thereof.

My composition is prepared and kept for use in a dry or powdered form, and consists as follows: Take equal parts, by measure, of ground slippery-elm bark and ripe or seeded lobelia-heads, crusheds or ground; mix well together in the form of meal or powder. This mixture is prepared for use by adding hot water in the usual way for making poultices.

Numerous applications of my poultice to felons, gathered breasts, &c., have, it is believed, shown more powerful relaxing and drawing properties than any other preparation.

I claim as new and of my invention—

The poultice mixture prepared, composed, and compounded as described.

In testimony of which invention I hereunto set my hand.

JOHN P. SCOTT.

Witnesses:
GEO. H. KNIGHT,
CHARLES L. FISHER.